Dec. 8, 1959 W. M. HOBBS ET AL 2,916,252

FLUID VALVE

Filed Jan. 9, 1957

INVENTORS
WILLIAM M. HOBBS
WILLARD J. HARPER
JACK D. MEESS
BY
ATTORNEYS

2,916,252
FLUID VALVE

William M. Hobbs, Baltimore, Md., Willard J. Harper, Allison Park, and Jack D. Meess, Pittsburgh, Pa., assignors, by mesne assignments, to the United States of America as represented by the Secretary of the Air Force Application January 9, 1957, Serial No. 633,375

2 Claims. (Cl. 251—129)

This invention relates to a fluid shut-off valve, and more particularly to a solenoid operated fluid valve.

The object of the invention is to provide a fluid, solenoid operated fluid valve which is small in size, light in weight, but also has an unusually great fluid carrying capacity.

A further object of the invention is the provision of a fluid solenoid operated valve which has a high flow rate with a minimum of pressure drop.

A further object of the invention is the provision of a solenoid operated fluid valve which combines new features in such a manner that a high fluid carrying capacity is obtained in a device which is at the same time light in weight.

A further object of the invention is the provision of a solenoid operated fluid valve wherein the formation of the solenoid core and the moving plunger is such that the air gap between them is less than the total travel of the piston, thus minimizing power requirements.

A further object of the invention is the provision of a solenoid operated valve which has a unique relationship of solenoid plunger and piston such that all alignment problems are automatically cared for and no binding or jamming of parts can take place.

A further object of the invention is the provision of a solenoid operated valve having a cushioned balance between the operating solenoid plunger and the piston receiving the impact such as to bias the valve continuously to closed position.

A further object of the invention is the provision of a valve contrived in such a manner that a portion of the valve head always contacts the piston cylinder to form a guide, and at the same time, flow of fluid is never completely cut off at this point.

Further objects and advantages will appear as the description proceeds.

Figures 1, 2, 3:
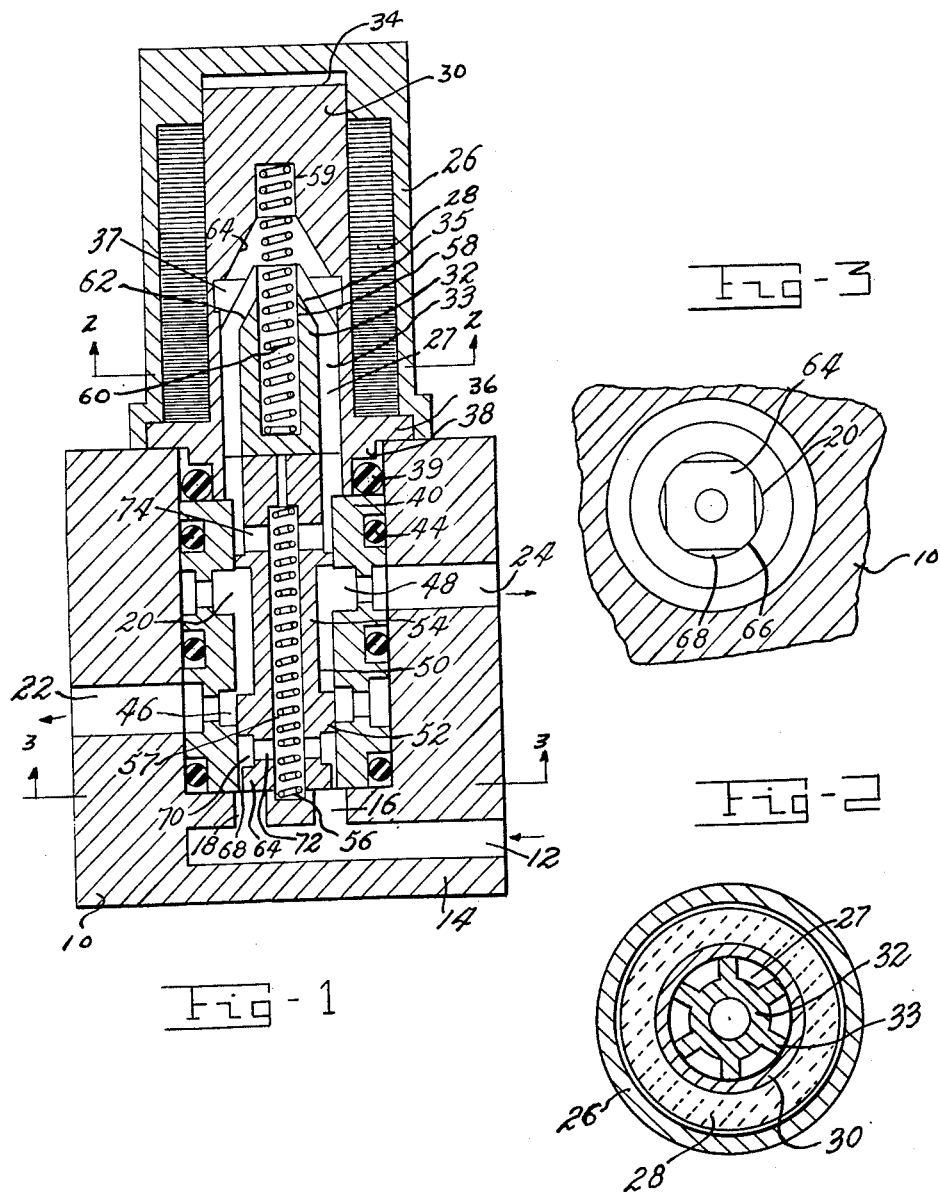
Figure 1 is a vertical cross section of the device.
Figure 2 is a cross section taken substantially on the line 2—2 of Figure 1.
Figure 3 is a cross section taken substantially on the line 3—3 of Figure 1.

Referring more in detail to the drawing, a valve body 10 is provided with an inlet opening 12 and duct 14 communicating through ducts 16 and 18 with an axially extending bore 20. An outlet 22 and a sump outlet 24 also communicate with the central or axial bore 20. The number and placement of inlet, outlet and sump openings are optional. The invention could conceivably be applied to a compound valve.

A housing or casing 26 is secured to the valve body 10. The casing 26 forms a housing for the elements comprising the solenoid: a coil 28, a solenoid core 30, and the solenoid plunger 32.

The core 30 terminates short of the end of the solenoid casing 26, leaving a space 34 therebetween. The solenoid plunger 32 is provided with axially extending and circumferentially positioned guides or webs 33 which fit the interior circumference of the bore provided therefor in the core 30, functioning as guides and at the same time, augmenting, by means of the air passages, the air gap formed between the pole faces of the core and plunger. These pole faces are complementary and substantially frusto conical in form. The web members 33 continuing into the web sections 35 and follow the pole face angle of the plunger 32, thus forming continuous fluid passages 27. An air gap augmented by the undercut 37 is thus maintained between the core and plunger, and is a continuation of the oil or fluid passage areas in the piston cylinder and the spring chamber 57 within the piston. The collar 36 is secured to the casing 26, and to valve body 10 in any suitable manner. The shoulder 38 defines a recess for a bushing or packing 39.

A piston cylinder 40 is fitted into the bore 20 and forms a part of the valve body. It is provided with a plurality of externally placed circumferential annular grooves which contain bushings or packing rings 44. The cylinder or valve body 40 is provided with openings 46 and 48 which communicate with outlet 22 and sump outlet 24 respectively.

A valve piston 50 reciprocates in the piston cylinder 40 and is provided with the annular circumferentially surfaced valve head 52. A portion 54 of reduced diameter provides for free fluid flow. In the position of the piston shown in Figure 1, free fluid flow is allowed between outlet 22 and sump 24.

The piston 50 is actuated, and the valve position changed to close the passage from outlet to sump and open a passage between inlet and outlet, by energization of the solenoid, and a balanced spring interaction between piston and plunger. The piston and plunger are separate and unattached. The valve piston 50 is held in contact with the plunger 32 by means of a long slender spring 56 contained in an axial recess or spring chamber 57. It is seated at one of its ends in the axial recess in the piston, and at its other end in a portion of the valve body, so that its bias is in a direction to maintain contact between piston 50 and plunger 32, and operate the valve piston to open position.

The solenoid core 30 and plunger 32 are formed with oppositely disposed recesses 58 and 59 which provide seats for a compression spring 60, whose bias is in a direction to hold the member 32 separated from the core 30 and in contact with the valve piston 50.

When the coil 28 is deenergized, the various elements of the device assume the position as described above, and as shown in Figure 1 of the drawing. This occurs because the spring 60 is of sufficient strength to override the spring 56.

The pole face surface of the plunger 32, except as interrupted by the spring recess 58, is of frusto conical formation, as shown at 32 in Figure 1. The pole face of the core 30 is formed with a complementary conical recess 64, which is contacted only by the splines or web portions 35, maintaining an air gap between core and plunger.

When the coil 28 is energized, the plunger 32 is activated to overcome the bias of spring 60, and close the gap between plunger and core. The spring 56 is free to operate the valve piston and open the passage between inlet and outlet.

Due to the pole face angle and the formation of the air gap between plunger and core, the air gap is smaller than the total travel of the plunger, and the power requirements for actuating the solenoid are thereby minimized. Actually, the whole construction is designed so that the valve can be operated successfully with a minimum expenditure of power, and each detail contributes to the accomplishment of this objective. Fluid passages through the moving elements keep the fluid pressure balanced throughout the interior of the casing, and the choice of metals is such as to reduce friction.

The lower guide land 64 of the valve piston 50 is substantially square or polygonal in cross section, with arcuate corner sections 66 fitting the piston cylinder as shown in Figure 3. The closely fitting arcuate corner sections provide guides for the piston 50, and at the same time allow continuous passage of fluid through the areas 68, provided by the flat surfaces on the land guide 64, and into the space formed by an annular groove 70 in the piston 50. Openings or transverse borings 72 and 74 are provided which communicate with the axial spring chamber 57 and provide for pressure balance. This device provides for a high flow rate, with an extremely low pressure drop.

Comparative tests between this unit and other manufacturers' components indicate that the above described device is smaller and lighter than other units having comparable performance.

We claim:

1. In a solenoid operated balanced valve comprising a valve body having inlet and outlet passages and a valve piston chamber in communication therewith, a solenoid casing, a core in said casing having a solenoid chamber, a solenoid operated plunger positioned in said solenoid chamber and reciprocable therein, said solenoid chamber having continuous fluid communication with said piston chamber, a piston reciprocable in said piston chamber, an annular valve head on said piston for opening and closing said inlet and outlet passages, said piston adapted to abut said plunger, said piston having an axially extending centrally located spring chamber, a spring in said piston spring chamber arranged to bias said valve to open position, said solenoid core having a centrally located, axially extending spring chamber, said plunger having an axially extending centrally located spring chamber facing and complementary to the spring chamber in said core, a spring seated in said core and plunger chambers and operating between said core and said plunger to override said piston spring and bias said core and plunger into spaced relationship and hold said piston in valve open position (complementary pole faces on said core and said plunger, said plunger having peripherally located, axially extending recesses providing continuous fluid communication between said solenoid chamber and said piston chamber.

2. A solenoid operated balanced valve comprising a valve body having inlet and outlet passages and a valve piston chamber in communication therewith, a piston provided with an annular valve head reciprocable in said chamber for opening and closing said passages, continuously cushioned means for operating said valve piston, said means comprising a piston spring positioned in an axially extending spring chamber in said piston arranged to continuously bias said piston to its open position, a solenoid casing, a solenoid plunger slidable in said casing and abutting an end of said piston, an angular pole face on said plunger, a solenoid core attached to said valve body and having a core chamber communicating with the piston chamber, complementary mating pole faces on said plunger and core respectively, said plunger and said core being provided wtih centrally located, axially extending aligned and facing spring recesses, a plunger spring seated in said recesses and of sufficient strength to override the pressure of said piston spring and maintain spaced relation between said solenoid core and plunger, said piston in valve open position against the bias of said piston spring, means for energizing said solenoid to overcome the bias of said solenoid spring and allow said piston spring to move said piston to its valve closed position, the exterior surface of the plunger having axially extending fluid passages extending onto and over the angular pole face of said plunger, said piston having a transverse bore, whereby fluid communication is maintained between said piston spring chamber, said piston chamber, said fluid passages in said solenoid plunger and said plunger chamber.

References Cited in the file of this patent

UNITED STATES PATENTS

| | | |
|---|---|---|
| 663,346 | Johnson | Dec. 4, 1900 |
| 1,460,517 | Stevens | July 3, 1923 |
| 2,207,082 | Wetzel | July 9, 1940 |
| 2,391,277 | Stapleton | Dec. 18, 1945 |
| 2,404,349 | Brant et al. | July 23, 1946 |
| 2,404,514 | McClure | July 23, 1946 |
| 2,407,963 | Persons | Sept. 17, 1946 |
| 2,612,907 | Harris | Oct. 7, 1952 |
| 2,663,319 | Marinelli | Dec. 22, 1953 |
| 2,797,061 | Buchanan | June 25, 1957 |